United States Patent
Dobberphul et al.

(10) Patent No.: US 10,983,519 B2
(45) Date of Patent: Apr. 20, 2021

(54) FUNCTIONAL MODULE, CONTROL UNIT FOR AN OPERATION ASSISTANCE SYSTEM, AND DEVICE

(71) Applicant: VOLKSWAGEN AKTIENGESELLSCHAFT, Wolfsburg (DE)

(72) Inventors: Timo Dobberphul, Braunschweig (DE); Reno Davids, Braunschweig (DE)

(73) Assignee: Volkswagen Aktiengesellschaft

( * ) Notice: Subject to any disclaimer, the term of this patent is extended or adjusted under 35 U.S.C. 154(b) by 261 days.

(21) Appl. No.: 16/164,294

(22) Filed: Oct. 18, 2018

(65) Prior Publication Data
US 2019/0121359 A1    Apr. 25, 2019

(30) Foreign Application Priority Data
Oct. 19, 2017    (DE) .................... 10 2017 218 643.7

(51) Int. Cl.
*G05D 1/00*    (2006.01)
*G06F 11/07*    (2006.01)
(Continued)

(52) U.S. Cl.
CPC ......... *G05D 1/0088* (2013.01); *B60W 50/029* (2013.01); *G05B 19/4155* (2013.01);
(Continued)

(58) Field of Classification Search
CPC .... G05D 1/0088; G05D 1/00; G06F 11/0739; G06F 11/0754; G06F 11/0793;
(Continued)

(56) References Cited

U.S. PATENT DOCUMENTS 9,514,645 B2 * 12/2016 Hallek .................. G08G 1/166
2003/0105537 A1 * 6/2003 Crispin ................. F02D 41/221
700/20
(Continued)

FOREIGN PATENT DOCUMENTS

DE      10043914 A1    5/2001
DE    102011086530 A1    5/2012
(Continued)

OTHER PUBLICATIONS

Search Report for German Patent Application No. 10 2017 218 6431; dated Jul. 13, 2018.

*Primary Examiner* — Shardul D Patel
(74) *Attorney, Agent, or Firm* — Barnes & Thornburg LLP (57) ABSTRACT

A functional module for an operational assistance system of a work apparatus or for a driving assistance system of a transportation vehicle for controlling a function of a piece of equipment of the work apparatus or of the transportation vehicle having a main function unit to produce and provide a function parameter set having at least one function parameter for control of the function of the piece of equipment and having a test and auxiliary function unit. The test and auxiliary function unit tests the function parameter set of the main function unit and takes a result of the test as a basis for outputting the function parameter set of the main function unit in a normal mode of operation to control the function of the piece of equipment.

21 Claims, 3 Drawing Sheets

(51) Int. Cl.
*B60W 50/029* (2012.01)
*G05B 19/4155* (2006.01)

(52) U.S. Cl.
CPC ...... *G06F 11/0739* (2013.01); *G06F 11/0754* (2013.01); *G06F 11/0793* (2013.01); *B60W 2050/0292* (2013.01)

(58) Field of Classification Search
CPC ....... B60W 50/029; B60W 2050/0292; B60W 50/0205; B60W 50/0225; B60W 2050/021; G05B 19/4155
USPC ............................................. 701/23; 367/101
See application file for complete search history.

(56) References Cited

U.S. PATENT DOCUMENTS

| | | | | |
|---|---|---|---|---|
| 2014/0277608 | A1* | 9/2014 | Debouk | G05B 9/02 700/79 |
| 2016/0103450 | A1* | 4/2016 | Hogenmueller | B60W 30/00 701/23 |
| 2017/0115661 | A1* | 4/2017 | Pink | B60W 50/023 |
| 2019/0049958 | A1* | 2/2019 | Liu | G06N 3/02 |
| 2019/0100105 | A1* | 4/2019 | Liu | B60L 3/0046 |

FOREIGN PATENT DOCUMENTS

| | | |
|---|---|---|
| DE | 102011100982 A1 | 9/2012 |
| DE | 102012024818 A1 | 9/2013 |
| DE | 102013208700 A1 | 11/2014 |
| DE | 102014212384 A1 | 12/2015 |
| DE | 102014011802 A1 | 2/2016 |
| DE | 102014220781 A1 | 4/2016 |
| DE | 102016106294 A1 | 10/2016 |
| DE | 102015211451 A1 | 1/2017 |
| EP | 1219489 A2 | 7/2002 |
| WO | 2016162624 A1 | 10/2016 |

* cited by examiner

FUNCTIONAL MODULE, CONTROL UNIT FOR AN OPERATION ASSISTANCE SYSTEM, AND DEVICE

PRIORITY CLAIM

This patent application claims priority to German Patent Application No. 10 2017 218 643.7, filed 19 Oct. 2017, the disclosure of which is incorporated herein by reference in its entirety.

SUMMARY

Illustrative embodiments relate to a functional module for controlling a function of a piece of equipment, to a control unit for an operational assistance system of a work apparatus and to a work apparatus. Illustrative embodiment relate, in particular, to a functional module for a driving assistance system of a transportation vehicle, for instance, an autonomously driving transportation vehicle; to a control unit for a driving assistance system of a transportation vehicle, for instance, an autonomously driving transportation vehicle; and to a transportation vehicle designed for autonomous driving.

BRIEF DESCRIPTION OF THE DRAWINGS

Disclosed embodiments are explained with reference to the drawings, in which.

DETAILED DESCRIPTION

Increasingly, operational assistance systems for work apparatuses and, in particular, driving assistance systems for transportation vehicles, especially if the transportation vehicles are designed for autonomous driving, are being used to a greater extent. Since such operational assistance systems and, in particular, driving assistance systems take direct action in the operation of a work apparatus, in particular, a transportation vehicle, the applicable system components need to remain operable in a safe mode and with a minimum extent of functions even in a fault situation.

To be able to maintain fail-safe and fail-functional properties of this kind at least in part, conventionally a comparatively high level of algorithmic, process-oriented and/or circuit-oriented sophistication is required. Nevertheless, the requisite fail-safe and fail-functional properties cannot be ensured under all circumstances and to any desired extent.

DE 10 2011 086530 A1 relates to a microprocessor system with a fault-tolerant architecture that is designed for executing at least partially safety-critical software modules during control of functions associated with software modules.

DE 10 2012 024818 A1 describes a method for improving the functional safety and increasing the availability of an electronic control system, and an electronic control system as such.

DE 10 2015 211451 A1 discloses a method for preventing manipulation of useful data packets to be transmitted between system components via a bus system.

Disclosed embodiment provide a functional module, a control unit for an operational assistance system and a work apparatus as such that allow fail-safe and fail-functional properties to be guaranteed unconditionally using simple means and nevertheless reliably.

Disclosed embodiments provide a functional module, a control unit for an operational assistance system of a work apparatus, and a work apparatus.

According to a first disclosed embodiment, a functional module is provided for an operational assistance system of a work apparatus or for a driving assistance system of a transportation vehicle, in particular, an autonomously driving transportation vehicle, that is configured for controlling a function of a piece of equipment of the work apparatus or of the transportation vehicle. Further, the functional module is designed (a) to have a main function unit, configured to produce and provide a function parameter set having at least one function parameter for control of the function of the piece of equipment, and (b) to have a test and auxiliary function unit. The test and auxiliary function unit is configured (i) to test the function parameter set of the main function unit and (ii) to take a result of the test as a basis for outputting the function parameter set of the main function unit in a normal mode of operation to control the function of the piece of equipment and producing an auxiliary parameter set having at least one auxiliary parameter in an auxiliary mode of operation and outputting the auxiliary parameter set to control the function of the piece of equipment. The measures provided allow a check on the main function unit, specifically while avoiding termination of operation, namely as a result of the use of the test and auxiliary function unit, which, on leaving the normal mode of operation, produces an auxiliary parameter set during an auxiliary mode of operation to maintain the function of the underlying piece of equipment and outputs the auxiliary parameter set to control the function of the piece of equipment.

The design and function of the disclosed functional module are beneficial if the main function unit has a higher algorithmic and/or circuit-oriented control and functional complexity than the test and auxiliary function unit.

In particular, the main function unit may be configured for maximum comfort and to meet all demands made on the function, and the test and auxiliary function unit may be configured in simpler fashion and not for the same comfort, wherein the test and auxiliary function unit does not comply with all demands on the function, but rather complies with only the most necessary for maintaining safe control of the function of the piece of equipment of the work apparatus or of the transportation vehicle.

The concept of higher functional complexity can be seen within the context of a larger number of inputs, a larger number of parameters for calculation, a higher variance of the parameters, non-simple mathematical associations and/or different associations, in particular, on the basis of states.

In respect of safety properties, it is further beneficial if additionally or alternatively the main function unit is designed for functional and/or operational safety according to a QM level of the ISO 26262 standard.

In addition, there may be provision in this context, according to another exemplary embodiment of the disclosed functional module, for the test and auxiliary function unit to be designed for functional and/or operational safety according to an ASIL-D level of the ISO 26262 standard.

In an overall view, the result is thus a structure for a functional module that is able to provide an overall comparatively complex function on an ASIL-D level, wherein, in a fault situation, an auxiliary function is provided on a higher safety level of the ASIL-D tier and adds to the more complexly configured main function unit with a QM level as a replacement, which means that the disclosed functional module is overall able to ensure even complex functions with a fail-safe property and/or with a fail-functional property.

To be able to ensure the closest possible coupling to a specific operating situation for an underlying work apparatus, another configuration of the disclosed functional module has provision for the main function unit and/or the test and auxiliary function unit to be configured to receive an input parameter set having at least one input parameter, which input parameter set is representative of the status and/or the operation of the underlying work apparatus or of the underlying transportation vehicle and, in particular, of a respective piece of equipment and is identical, and to take the input parameter set as a basis for producing the function parameter set or the auxiliary parameter set.

The auxiliary function can also have a smaller input parameter set.

Fundamentally, there are various options for checking the correct operation of the main function unit.

Whenever correct operation of the main function unit is obtained as a result of the test result, the test and auxiliary function unit operates in the normal mode of operation, where, in this mode, the function parameter set of the main function unit is output without alteration and therefore more or less forwarded.

If the result of the test result from the test and auxiliary function unit is that the main function unit is not operating correctly, there is a switch to the auxiliary mode of operation, in which, for example, in the test and auxiliary function unit, taking into consideration all of the circumstances of the status and operation and, for example, also of the underlying piece of equipment or else further units, for example, also of the functional module and of sensors connected thereto themselves, auxiliary parameters are produced and are output to control the function of the piece of equipment.

In at least one disclosed functional module, the test and auxiliary function unit is configured to test function parameters produced and provided by the main function unit and picked up from the main function unit by the test and auxiliary function unit for plausibility in regard to the status and/or to the operation of the underlying work apparatus or of the underlying transportation vehicle and, in particular, of a respective piece of equipment.

In this case, it is beneficial if the test and auxiliary function unit is configured to operate in the normal mode of operation when plausibility is present and to operate in the auxiliary mode of operation when plausibility is absent.

Fundamentally, certain or all of the function parameters produced and provided by the main function unit can be modified in the auxiliary mode of operation to safely maintain operation, certain parameter values also being able to be distinguished, depending on the application.

As such, in another disclosed embodiment of the functional module, there is provision for the test and auxiliary function unit to be configured so as, in the auxiliary mode of operation, to set a function parameter produced and provided by the main function unit and picked up from the main function unit by the test and auxiliary function unit to a zero value, to a status- and/or operation-dependent saturated and, in particular, minimum value, to a status- and/or operation-dependent saturated and, in particular, maximum value and/or to a status- and/or operation-dependent setpoint value to be determined with lower complexity than in the main function unit and to output it as an auxiliary parameter.

Fundamentally, suitable configurations of the functional module as a whole are conceivable for a respective application and they are not tied to one particular physical structure.

As such, according to a disclosed embodiment of the functional module, the functional module may be designed entirely or, in particular, in respect of the main function unit and/or the test and auxiliary function unit, partially as a software component and/or as an application-specific integrated circuit, that is to say as an ASIC.

All hybrid forms in which certain components are implemented in hardware, whereas others are present as a software implementation, are also conceivable.

According to another disclosed embodiment, a control unit for an operational assistance system of a work apparatus and, in particular, for a driving assistance system of a transportation vehicle, in particular, an autonomously driving transportation vehicle, is also provided. The transportation vehicle is designed to have at least one disclosed functional module for controlling a function of a piece of equipment of the work apparatus or of the transportation vehicle.

Further, disclosed embodiments also provide a work apparatus as such and, in particular, an autonomously driving transportation vehicle that is designed to have at least one piece of equipment for operating the work apparatus or the transportation vehicle and to have a control unit that, according to the disclosure and for the purpose of controlling the at least one piece of equipment, is designed as part of an operational assistance system and/or of a driving assistance system.

The text below provides a detailed description of exemplary embodiments with reference to FIGS. 1 to 3. The same and equivalent elements and components, and elements and components having the same or an equivalent effect, are denoted by the same reference signs. The detailed description of the denoted elements and components is not reproduced in every instance of their occurrence.

The depicted features and further properties can be combined with one another in any form in isolation from one another and as desired without departing from the essence of the disclosure.

Figure 1:
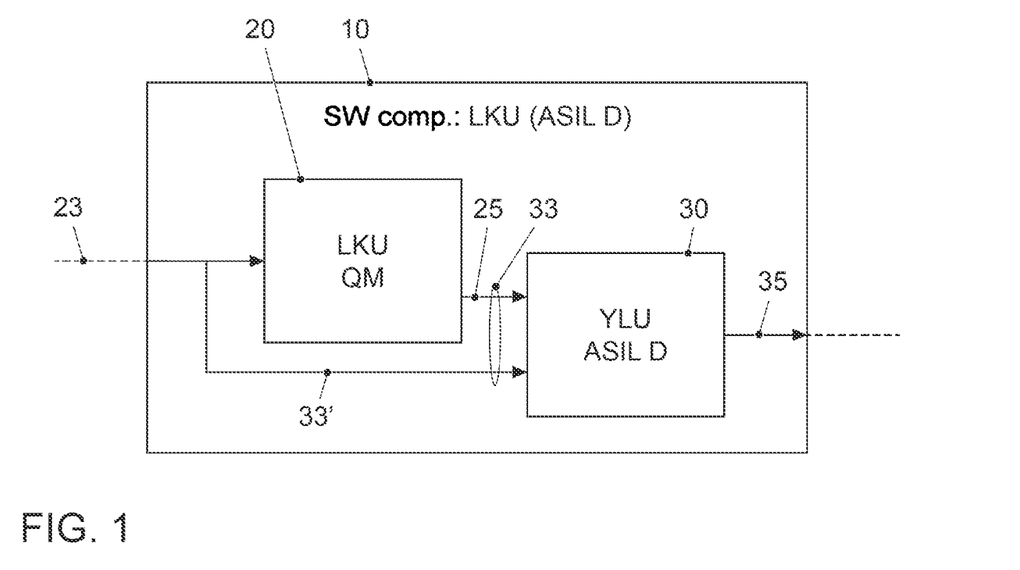
FIG. 1 schematically shows an exemplary embodiment of the disclosed functional module by use of a block diagram.
Figure 2:
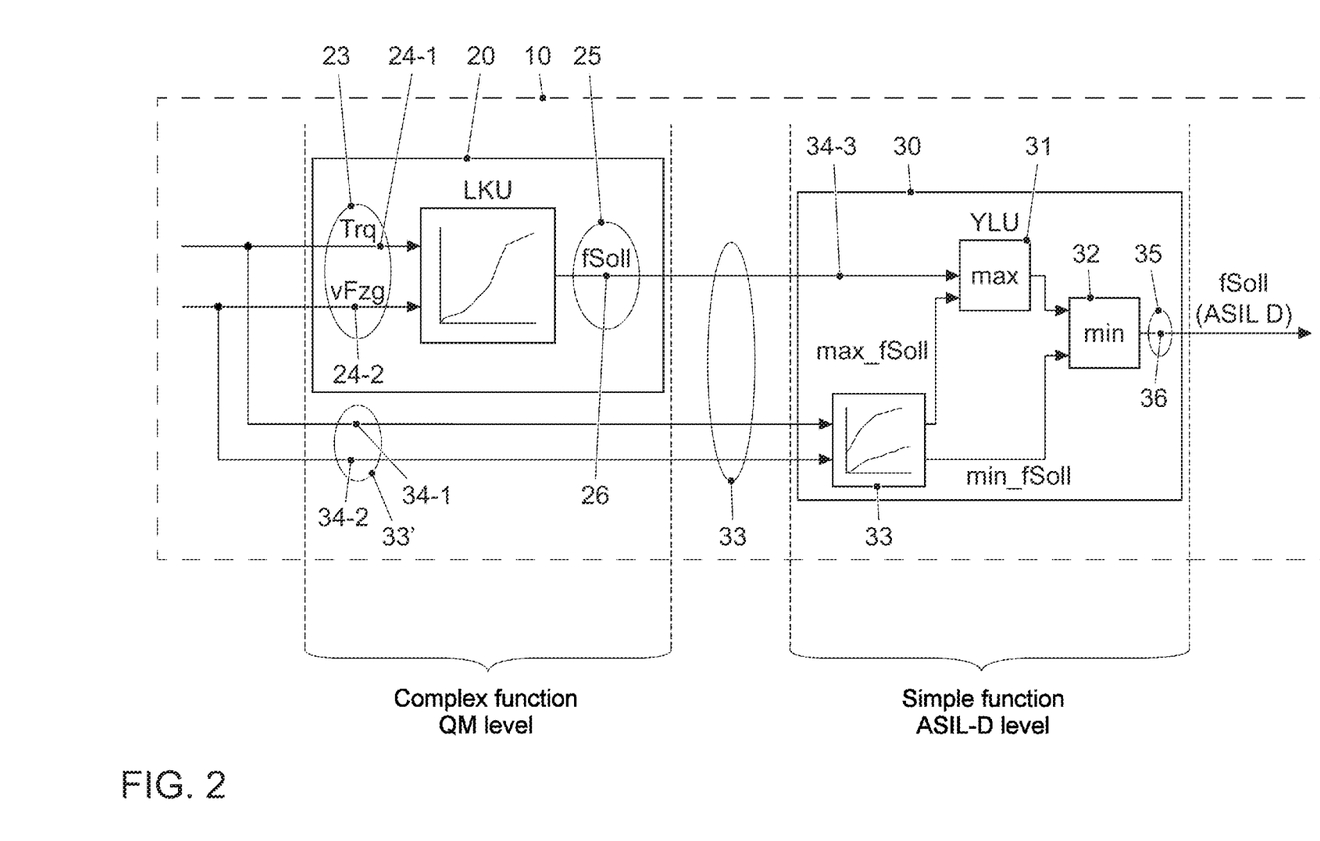
FIG. 2 schematically shows an exemplary embodiment of the disclosed functional module by use of a block diagram.

FIGS. 1 and 2 schematically show exemplary embodiments of the disclosed functional module 10 in the style of block diagrams.

In the disclosed embodiment shown in FIGS. 1 and 2, disclosed the functional module 10 consists of a main function unit 20 and a test and auxiliary function unit 30.

The functional module 10 picks up an input parameter set 23 having one or more input parameters 24-1, 24-2 via an appropriate line or a plurality of lines or, in the case of a software implementation, via appropriate transfer parameter lists, the input parameters 24-1, 24-2 being able to be representative of a status and/or an operation of the underlying work apparatus 1 or of the transportation vehicle 1 as a whole or of a piece of equipment 2, 3, 4 of the work apparatus 1 or of the transportation vehicle 1, for example.

On the basis of the input parameter set 23, the main function unit 20 produces a function parameter set 25 having at least one function parameter 26 and provides the function parameter set.

The test and auxiliary function unit 30 provided according to the disclosure, for its part, picks up an input parameter set 33' that is identical to the input parameter set 23 of the main function unit 20. Additionally, the test and auxiliary function unit 30 is also supplied with the function parameter set 25 having the function parameter 26, which means that the input parameter set 33 of the test and auxiliary function unit 30 consists of the input parameters 24-1, 24-2 for the main function unit 20, that is to say parameters describing the status and the operation, and of the function parameters 26 produced by the main function unit 20.

On the basis of all of the parameters supplied to the test and auxiliary function unit 30, a test is performed to determine whether the main function unit 20 is in a normal operating state, namely, for example, by checking for the presence or absence of plausibility for the function parameters 26 derived by the main function unit 20 for controlling a piece of equipment 2, 3, 4.

If the function parameters 26 derived by the main function unit 20 for controlling a piece of equipment 2, 3, 4 are plausible in respect of the input parameters 24 describing the status and/or the operation, for example, because they are in a value range consistent with the status and/or with the operation or are in an appropriate set of values, then the test and auxiliary function unit 30 is operated in the normal mode of operation, in which the function parameters 26 derived by the main function unit 20 for controlling a piece of equipment 2, 3, 4 are output.

If the function parameters 26 derived by the main function unit 20 for controlling a piece of equipment 2, 3, 4 are not plausible in respect of the input parameters 24 describing the status and/or the operation, however, for example, because they are not in a value range consistent with the status and/or the operation or are in an applicable set of values, then the test and auxiliary function unit 30 is operated in the auxiliary mode of operation, in which the function parameters 26 derived by the main function unit 20 for controlling a piece of equipment 2, 3, 4 are output not directly, but rather at most in modified form, that is to say an auxiliary parameter set 35 that has at least one auxiliary parameter 36 suitable for ensuring the function of the respective piece of equipment 2, 3, 4 even in a fault situation.

In the exemplary embodiment shown in FIGS. 1 and 2, the functional module 10, which may be designed as an ASIC and/or as a software construct, is what is known as a unit for steering assistance, also referred to as an LKU.

An exemplary embodiment as an analog or digital circuit would also be conceivable. The depiction in respect of a steering assistance unit LKU is chosen purely by way of example here, the concept according to the disclosure generally being able to be used for all of the functions individually or in combination with one another.

The main function unit 20 is used for determining a parameter as a function parameter 26 for producing the actual steering assistance, specifically on a safety level QM within the context of the ISO 26262 standard. In this case, the input parameters 24-1 and 24-2 of the input parameter set 23 that are supplied to the main function unit 20 are a value of the driver's manual torque Trq and a value of the transportation vehicle speed vFzg, for example. A value for an assistance force fSoll that an applicable piece of equipment 2, 3, 4 of a steering assistance is supposed to impart on wheels to be steered is produced and provided in a determination unit 21, for example.

The value of the assistance force fSoll is tested for plausibility in respect of the driver's manual torque Trq and in respect of the transportation vehicle speed vFzg, for example, using a computation unit 31-3 to determine a minimum value min_fSoll and a maximum value max_fSoll for the assistance force fSoll and using a maximum comparator 31-1 and a minimum comparator 31-2, so that, when the units 31-1 to 31-3 interact, a saturated value fSoll is produced on a safety level ASIL-D in the ISO 26262 standard, specifically using a determination scheme that is simplified and thus less complex in comparison with main function unit 20.

Figure 3:
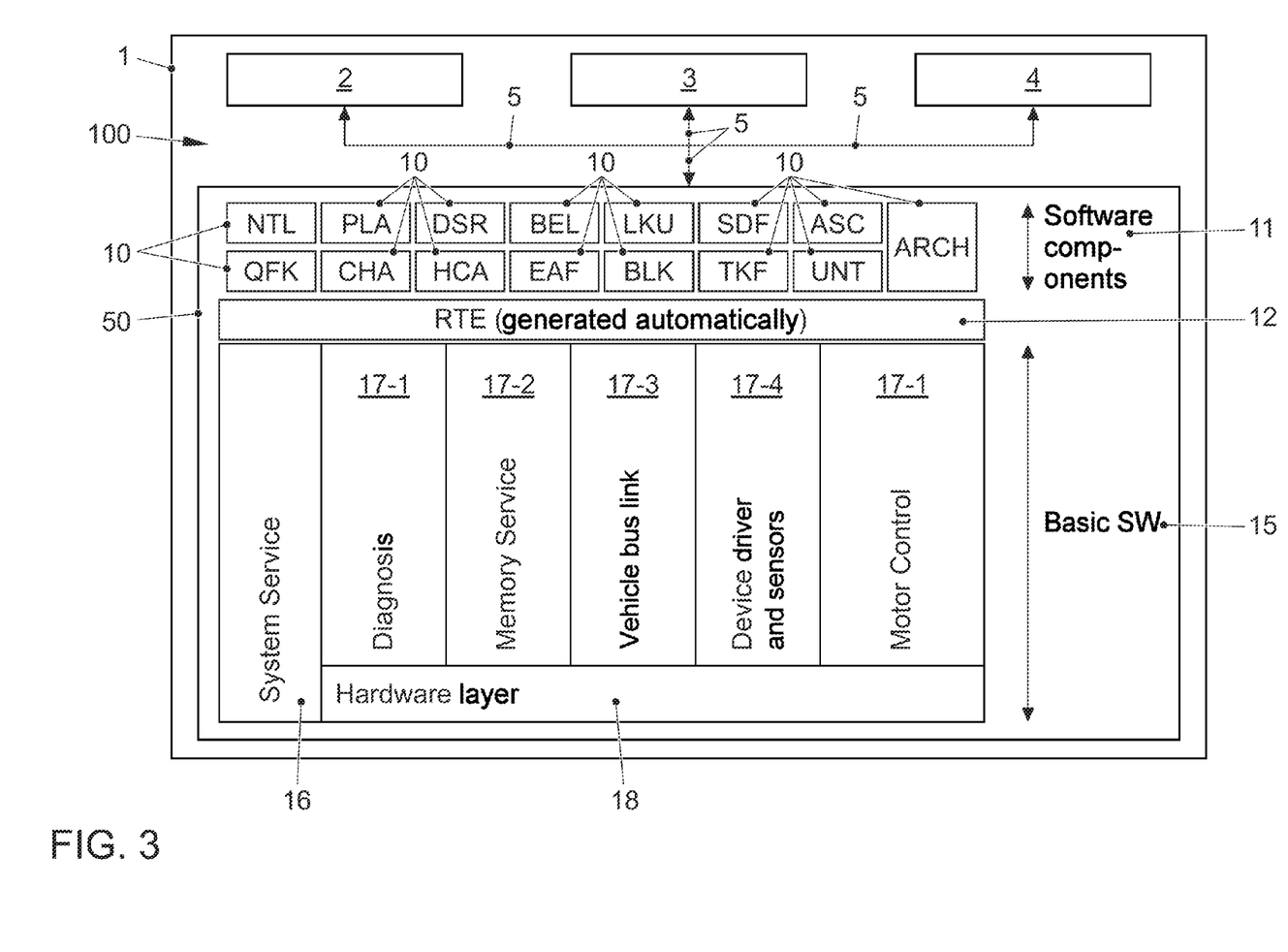
FIG. 3 schematic shows a block diagram of an exemplary embodiment of the disclosed work apparatus and, in particular, of the disclosed transportation vehicle, using exemplary embodiments of the disclosed functional module in connection with an operational assistance system.

FIG. 3 likewise shows an exemplary embodiment of the disclosed work apparatus 1 and, in particular, of the disclosed transportation vehicle 1 in the style of a schematic block diagram using exemplary embodiments of the disclosed functional module 10 in connection with an operational assistance system 100, for example, within the context of a driving assistance system 100 of a transportation vehicle 1.

The disclosed transportation vehicle 1, as shown in FIG. 3, has a plurality of pieces of equipment 2, 3, 4 operatively connected via a line system or a bus 5 to a control unit 50 designed according to the disclosure.

The disclosed control unit 50, as shown in FIG. 3, has a plurality of functional modules 10 according to the disclosure, including inter alia a functional module 10 for steering assistance, denoted by LKU.

All of the functional modules 10 form a layer 11 of inherently safe software components based on the ASIL-D level of the ISO 26262 standard.

The layer 11 of the software components has a layer 12 added beneath it in the hierarchy for the runtime environment (RTE).

This is followed by a layer 15 having components of the basic software, for example, having a system service 16, and also services 17-1, 17-2, 17-3, 17-4, 17-5 for the diagnosis, the memory service, the bus link in the transportation vehicle, for device drivers and for the sensors and for the motor control.

A hardware layer 18 is connected at the bottom of the hierarchy.

In connection with the present disclosure, the design as a software architecture based on the Autosar standard is also conceivable.

These and further features and properties of the present disclosure are explained further on the basis of the explanations that follow:

In the case of safety-relevant applications and control units 50, which need to have a high level of availability, for example, in the case of controllers 50 for autonomously driving transportation vehicles 1, there must be no failures as a result of software errors, for example.

However, since it is known not to be possible to create a demonstrably error-free control architecture and, in particular, a demonstrably error-free piece of software, for example, a respective architecture needs to be designed such that it is fault-tolerant or else fail-functional, the latter meaning that an operating unit controlled by a control architecture, for example, a piece of equipment or the like, can still be operated with minimum function even in a fault situation.

Furthermore, there is the requirement for the control units 50 and, in particular, software units 10 or SW units 10 of control units 50 to be as modular and reusable as possible to be able to use the respective control units 50 and the architecture thereof universally and to keep the integrated software SW maintainable.

As the complexity of the systems rises, these requirements become more difficult to implement, because interactions between the individual components, complex algorithms or freely parameterizable structures are no longer fully testable and replicable.

Previous software or SW architectures for safety-relevant systems are based either on redundant calculation (lockstep principle) or on monitoring functions that inspect the calculation results of the first level in a second level.

If the results of a calculation or control in Lockstep mode diverge, the only remaining option is deactivation of the system.

The situation is exactly the same with the monitoring functions. These can cater only for deactivation of the first level, which means that although an architecture with a fail-safe property is achieved, an architecture with a fail-functional property is not achieved.

It is known practice to use the option of a two-out-of-three decision and to bring about such a decision, specifically using three differently programmed systems or using software units running on different processor cores.

This entails a high level of software (SW) and/or hardware (HW) sophistication and frequently requires proprietary solutions, since there is no compatibility with existing standards.

Disclosed embodiments also relate, inter alia, to a software or SW architecture and thus to the design of applicable software components for implementing a disclosed functional module 10 that allows the development of a piece of software with high availability. All modules, seen as functional modules 10 within the context of the present disclosure, are created as standalone and inherently safe software components, for example, and can be integrated in modular fashion to produce one overall piece of software.

The disclosed embodiments also relate to the design of the individual SW modules within the context of a disclosed functional module 10.

Each individual module 10 has a complex function—namely provided by a main function unit 20—for implementing all requirements, and for parameterizing the components and the communication with other modules.

For safety-relevant systems, this function may be developed based on the QM standard, since its outputs are not encumbered with safety requirements. Furthermore, each module within the context of a disclosed functional module 10 accommodates a safety-relevant function, namely provided by a test and auxiliary function unit 30 within the context of the present disclosure, which implements the respective safety requirements by virtue of the outputs of the QM function and thus the function parameter set 25

(i) being overwritten with the function parameters 26 of the main function unit 20, (ii) being set to or forced into particular limits or value ranges, or (iii) being set to zero.

In this manner, the entire component—that is to say the entire functional module 10—is inherently safe and guarantees safety-compliant outputs, namely within the context of an ASIL-D level of the ISO 26262 standard, although complex algorithms can be calculated.

If these functional modules 10, for example, designed as inherently safe software components, are each designed as what is known as a Safety-Element-out-of-Context (SEooC), reusability is possible in subsequent projects or different embodiments.

Their design allows safety requirements to be tested and validated separately from a target system.

The following crucial differences, which can be combined with one another as desired, over the conventional approach exist, inter alia:

the possibility of splitting a piece of application software into modules within the context of disclosed functional modules 10, in particular, as software components, the possibility of implementing complex, parameterizable functions while simultaneously observing safety requirements, specifically for availability, the possibility of overwriting, deactivating, changing the outputs, namely of the function parameter set of a QM function, seen as the main function unit 20, by a downstream ASIL-D function, seen as the test and auxiliary function unit 30, being effected in each functional module 10 to ensure fault tolerance, and the possibility of an implementation as an SEooC unit and hence the possibility of universal usability while observing safety requirements.

Further benefits of the disclosed approach are:

the possibility of a modular design with inherently safe functional modules 10 in the disclosed structure, the possibility of reusability of the individual functional modules 10, the possibility of producing a concept with fault tolerance and/or a fail-functional property, the possibility of verification and validation of the components outside the target system, specifically as standalone and inherently safe components, the possibility of creating an SW architecture for autonomous driving, and the possibility of inexpensive implementation.

Even disclosure has been described in detail on the basis of the exemplary embodiments explained in conjunction with the accompanying figures of the drawing, modifications and combinations of features of the depicted exemplary embodiments are possible for a person skilled in the art without departing from the scope of the present disclosure, the scope of protection of which is defined by the accompanying claims.

LIST OF REFERENCE SIGNS

1 Transportation vehicle, work apparatus
2 Piece of equipment
3 Piece of equipment
4 Piece of equipment
5 Control bus
10 Functional module
11 Layer of the software components
12 Layer of the runtime environment (RTE)
15 Layer of the basic software
16 System service
17-1 Diagnosis
17-2 Memory service
17-3 Transportation vehicle bus link
17-4 Device driver and sensors
17-5 Motor control
18 Hardware layer
20 Main function unit
21 Determination unit, Computation unit
23 Input parameter set
24-1 Input parameter
24-2 Input parameter
25 Function parameter set
26 Function parameter
30 Test and auxiliary function unit
31-1 Maximum comparator
31-2 Minimum comparator
31-3 Computation unit
33' Input parameter set 33 (Extended) input parameter set
34-1 Input parameter
34-2 Input parameter
34-3 Input parameter
35 Auxiliary parameter set
36 Auxiliary parameter
50 Control unit
100 Operational assistance system, driving assistance system

The invention claimed is:

1. A controller for a transportation vehicle driving assistance system, the controller comprising:
a main function unit configured to produce and provide a function parameter set having at least one function parameter for control driver assistance system functionality; and
a test and auxiliary function unit,
wherein the main function unit and the test and auxiliary function unit are implemented as a combination of software stored on a non-transitory computer readable medium and/or an application specific integrated circuit, and
wherein the test and auxiliary function unit is configured to:
test the function parameter set of the main function unit to determine whether the at least one parameter is within a predetermined range of values to determine whether to operate the test and auxiliary function unit in a normal mode of operation or an auxiliary mode of operation output the function parameter set of the main function unit in response to a determination that the at least one parameter is within the predetermined range of values so as to operate the test and auxiliary function unit in the normal mode of operation to control driver assistance system functionality, and
produce an auxiliary parameter set having at least one auxiliary parameter in response to a determination that the at least one parameter is not within the predetermined range of values so as to operate the test and auxiliary function unit in the auxiliary mode of operation and outputting the auxiliary parameter set to control driver assistance system functionality,
wherein the main function unit is configured for functional and/or operational safety according to a first level of the ISO 26262 standard,
wherein the test and auxiliary function unit is configured for functional and/or operational safety according to a second level of the ISO 26262 standard, and
wherein the first level is different than the second level.

2. The controller of claim 1, wherein the main function unit:
has a higher algorithmic and/or circuit-oriented control and functional complexity than the test and auxiliary function unit, and/or
is configured for maximum comfort and to meet all demands made on the function, and the test and auxiliary function unit is configured in a simpler state and not for the same comfort and complies with only the most necessary demands made on the function for maintaining safe control of the function of the driver assistance system functionality of the transportation vehicle.

3. The controller of claim 1, wherein the first level is a QM level of the ISO 26262 standard.

4. The controller of claim 1, wherein the second level is an ASIL-D level of the ISO 26262 standard.

5. The controller of claim 1, wherein the main function unit and/or the test and auxiliary function unit receives an input parameter set having at least one input parameter, which input parameter set is representative of the status and/or the operation of the underlying transportation vehicle and is identical, and takes the input parameter set as a basis for producing the function parameter set or the auxiliary parameter set.

6. The controller of claim 1, wherein the test and auxiliary function unit is configured to:
test function parameters picked up from the main function unit for plausibility with reference to the status and/or to the operation of the underlying transportation vehicle and/or driver assistance system functionality, and
operate in the normal mode of operation when plausibility is present, and
operate in the auxiliary mode of operation when plausibility is absent.

7. The controller of claim 1, wherein the test and auxiliary function unit is configured, in the auxiliary mode of operation, to set a function parameter picked up from the main function unit:
to a zero value,
to a status- and/or operation-dependent minimum value,
to a status- and/or operation-dependent maximum value and/or
to a status- and/or operation-dependent setpoint value to be determined with lower complexity than in the main function unit, and
to output the function parameter as auxiliary parameter.

8. A control unit for a driving assistance system of a transportation vehicle, the control unit comprising:
a controller for the transportation vehicle driving assistance system, the controller comprising:
a main function unit configured to produce and provide a function parameter set having at least one function parameter for control driver assistance system functionality; and
a test and auxiliary function unit,
wherein the main function unit and the test and auxiliary function unit are implemented as a combination of software stored on a non-transitory computer readable medium and/or an application specific integrated circuit, and
wherein the test and auxiliary function unit is configured to:
test the function parameter set of the main function unit to determine whether the at least one parameter is within a predetermined range of values to determine whether to operate the test and auxiliary function unit in a normal mode of operation or an auxiliary mode of operation output the function parameter set of the main function unit in response to a determination that the at least one parameter is within the predetermined range of values so as to operate the test and auxiliary function unit in the normal mode of operation to control driver assistance system functionality, and
produce an auxiliary parameter set having at least one auxiliary parameter in response to a determination that the at least one parameter is not within the predetermined range of values so as to operate the test and auxiliary function unit in the auxiliary mode of operation and outputting the auxiliary parameter set to control driver assistance system functionality, wherein the main function unit is configured for functional and/or operational safety according to a first level of the ISO 26262 standard,
wherein the test and auxiliary function unit is configured for functional and/or operational safety according to a second level of the ISO 26262 standard, and
wherein the first level is different than the second level.

9. The control unit of claim 8, wherein the main function unit:
has a higher algorithmic and/or circuit-oriented control and functional complexity than the test and auxiliary function unit, and/or
is configured for maximum comfort and to meet all demands made on the function, and the test and auxiliary function unit is configured in a simpler state and not for the same comfort and complies with only the most necessary demands made on the function for maintaining safe control of driver assistance system functionality of the transportation vehicle.

10. The control unit of claim 8, wherein the first level is a QM level of the ISO 26262 standard.

11. The control unit of claim 8, wherein the second level is an ASIL-D level of the ISO 26262 standard.

12. The control unit of claim 8, wherein the main function unit and/or the test and auxiliary function unit receives an input parameter set having at least one input parameter, which input parameter set is representative of the status and/or the operation of the underlying transportation vehicle and is identical, and takes the input parameter set as a basis for producing the function parameter set or the auxiliary parameter set.

13. The control unit of claim 8, wherein the test and auxiliary function unit is configured to:
test function parameters picked up from the main function unit for plausibility with reference to the status and/or to the operation of the underlying transportation vehicle and/or of driver assistance system functionality, and
operate in the normal mode of operation when plausibility is present, and
operate in the auxiliary mode of operation when plausibility is absent.

14. The control unit of claim 8, wherein the test and auxiliary function unit is configured, in the auxiliary mode of operation, to set a function parameter picked up from the main function unit:
to a zero value,
to a status- and/or operation-dependent minimum value,
to a status- and/or operation-dependent maximum value and/or
to a status- and/or operation-dependent setpoint value to be determined with lower complexity than in the main function unit, and
to output the function parameter as auxiliary parameter.

15. An autonomous driving transportation vehicle apparatus comprising: at least one piece of equipment for operating the autonomous driving transportation vehicle; and a control unit for controlling the at least one piece of equipment as part of a driving assistance system of the autonomous driving transportation vehicle, the control unit including: a controller for controlling the at least one piece of equipment of the transportation vehicle driving assistance system, the controller comprising: a main function unit configured to produce and provide a function parameter set having at least one function parameter for control of the function of the at least one piece of equipment; and a test and auxiliary function unit wherein the main function unit and the test and auxiliary function unit are implemented as a combination of software stored on a non-transitory computer readable medium and/or an application specific integrated circuit, and wherein the test and auxiliary function unit is configured to: test the function parameter set of the main function unit to determine whether the at least one parameter is within a predetermined range of values to determine whether to operate the test and auxiliary function unit in a normal mode of operation or an auxiliary mode of operation output the function parameter set of the main function unit in response to a determination that the at least one parameter is within the predetermined range of values so as to operate the test and auxiliary function unit in the normal mode of operation to control the at least one piece of equipment and/or driver assistance system functionality, and produce an auxiliary parameter set having at least one auxiliary parameter in response to a determination that the at least one parameter is not within the predetermined range of values so as to operate the test and auxiliary function unit in the auxiliary mode of operation and outputting the auxiliary parameter set to control the at least one piece of equipment and/or driver assistance system functionality, wherein the main function unit is configured for functional and/or operational safety according to a first level of the ISO 26262 standard, wherein the test and auxiliary function unit is configured for functional and/or operational safety according to a second level of the ISO 26262 standard, and wherein the first level is different than the second level.

16. The apparatus of claim 15, wherein the main function unit:
has a higher algorithmic and/or circuit-oriented control and functional complexity than the test and auxiliary function unit, and/or
is configured for maximum comfort and to meet all demands made on the function, and the test and auxiliary function unit is configured in a simpler state and not for the same comfort and complies with only the most necessary demands made on the function for maintaining safe control of the function of the at least one piece of equipment of the transportation vehicle.

17. The apparatus of claim 15, wherein the first level is a QM level of the ISO 26262 standard.

18. The apparatus of claim 15, wherein the second level is an ASIL-D level of the ISO 26262 standard.

19. The apparatus of claim 15, wherein the main function unit and/or the test and auxiliary function unit receives an input parameter set having at least one input parameter, which input parameter set is representative of the status and/or the operation of the underlying transportation vehicle and is identical, and takes the input parameter set as a basis for producing the function parameter set or the auxiliary parameter set.

20. The apparatus of claim 15, wherein the test and auxiliary function unit is configured to:
test function parameters picked up from the main function unit for plausibility with reference to the status and/or to the operation of the underlying transportation vehicle and/or the at least one piece of equipment, and
operate in the normal mode of operation when plausibility is present, and
operate in the auxiliary mode of operation when plausibility is absent.

21. The apparatus of claim 15, wherein the test and auxiliary function unit is configured, in the auxiliary mode of operation, to set a function parameter picked up from the main function unit:
to a zero value,
to a status- and/or operation-dependent minimum value, to a status- and/or operation-dependent maximum value and/or to a status- and/or operation-dependent setpoint value to be determined with lower complexity than in the main function unit, and to output the function parameter as auxiliary parameter.

\* \* \* \* \*